United States Patent
Seto

(10) Patent No.: US 8,854,645 B2
(45) Date of Patent: Oct. 7, 2014

(54) METHOD OF DISPLAYING, PROCESSING AND STORING SEARCH SCREEN INFORMATION IN A HIERACHICAL STRUCTURE

(75) Inventor: Satoshi Seto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/598,727

(22) Filed: Aug. 30, 2012

(65) Prior Publication Data

US 2013/0083342 A1  Apr. 4, 2013

(30) Foreign Application Priority Data

Sep. 30, 2011 (JP) ................................. 2011-218490

(51) Int. Cl.
*G06F 3/12* (2006.01)
*G06F 17/30* (2006.01)

(52) U.S. Cl.
CPC ............................. *G06F 17/30991* (2013.01)
USPC ......................................................... 358/1.13

(58) Field of Classification Search
None
See application file for complete search history.

(56) References Cited

U.S. PATENT DOCUMENTS

| | | | | |
|---|---|---|---|---|
| 2003/0115199 A1* | 6/2003 | Ochiai et al. | ..................... | 707/10 |
| 2003/0154395 A1* | 8/2003 | Miura et al. | ................... | 713/200 |
| 2004/0243572 A1* | 12/2004 | Muto | ............................... | 707/3 |
| 2005/0289109 A1 | 12/2005 | Arrouye et al. | | |
| 2006/0274371 A1* | 12/2006 | Sakai | ........................... | 358/1.15 |
| 2007/0103719 A1* | 5/2007 | Azuchi | ....................... | 358/1.15 |
| 2009/0116053 A1* | 5/2009 | Selvaraj | ...................... | 358/1.15 |

FOREIGN PATENT DOCUMENTS

| | | |
|---|---|---|
| JP | 2003-288355 A | 10/2003 |
| JP | 2004-206553 A | 7/2004 |
| JP | 2006-190023 A | 7/2006 |
| JP | 2009-3737 A | 1/2009 |
| WO | WO 94/12944 A1 | 6/1994 |
| WO | WO 2005/041060 A1 | 5/2005 |

OTHER PUBLICATIONS

European Office Action, dated Oct. 11, 2013, issued in corresponding European Patent Application No. 12181870.2.

* cited by examiner

*Primary Examiner* — Jeremiah Bryar
(74) *Attorney, Agent, or Firm* — Birch, Stewart, Kolasch & Birch, LLP

(57) ABSTRACT

A search screen information processing system includes a display device, an input device, and a computer, and displays imposition templates acquired in search screen information based on a processing sequence of the computer. The search screen information processing system displays, as search screen information, a search condition menu display area in which search contents information corresponding to a plurality of search conditions can be entered, and imposition templates that agree with a plurality of entered pieces of search contents information. Further, the search screen information processing system creates folders based on the search contents information, constructs layers according to an order in which the search conditions are entered, and displays a plurality of folders based on layers in the search condition menu display area.

10 Claims, 10 Drawing Sheets

FIG. 2
26

| IMPOSITION TEMPLATE NAME | PRINTING PRESS | PLATE SIZE | SHEET SIZE | FINISHED SIZE | WORK STYLE | BINDING | CUSTOMER NAME | PRODUCT NAME |
|---|---|---|---|---|---|---|---|---|
| IMPOSITION TEMPLATE A | PRINTING PRESS A | 1030 × 770 | 939 × 636 | 148 × 210 | Come & Go 4 COLORS | PERFECT BINDING | COMPANY A | MONTHLY A |
| IMPOSITION TEMPLATE B | PRINTING PRESS B | 1030 × 770 | 939 × 636 | 148 × 210 | Come & Go 4 COLORS | PERFECT BINDING | COMPANY B | QUARTERLY B |
| IMPOSITION TEMPLATE C | PRINTING PRESS C | 1030 × 770 | 939 × 636 | 148 × 210 | N-up SINGLE COLOR | PERFECT BINDING | COMPANY C | WEEKLY C |
| IMPOSITION TEMPLATE D | PRINTING PRESS A | 1160 × 940 | 1091 × 788 | 148 × 210 | N-up SINGLE COLOR | | COMPANY D | POSTER D |
| IMPOSITION TEMPLATE E | PRINTING PRESS B | 1160 × 940 | 1091 × 788 | 148 × 210 | Come & Go 4 COLORS | | COMPANY E | FLYER E |
| IMPOSITION TEMPLATE F | PRINTING PRESS C | 1160 × 940 | 1091 × 788 | 148 × 210 | Come & Go 4 COLORS | PERFECT BINDING | COMPANY A | PAMPHLET F |
| IMPOSITION TEMPLATE G | PRINTING PRESS A | 1030 × 770 | 939 × 636 | 210 × 298 | Come & Go 4 COLORS | | COMPANY B | DIRECT MAIL G |
| IMPOSITION TEMPLATE H | PRINTING PRESS B | 1030 × 770 | 939 × 636 | 210 × 298 | Come & Go 4 COLORS | PERFECT BINDING | COMPANY C | MONTHLY H |
| IMPOSITION TEMPLATE I | PRINTING PRESS C | 1030 × 770 | 939 × 636 | 210 × 298 | N-up SINGLE COLOR | PERFECT BINDING | COMPANY D | BOOKLET I |
| IMPOSITION TEMPLATE J | PRINTING PRESS A | 1160 × 940 | 1091 × 788 | 210 × 298 | N-up SINGLE COLOR | | COMPANY A | FLYER J |
| IMPOSITION TEMPLATE K | PRINTING PRESS B | 1160 × 940 | 1091 × 788 | 210 × 298 | Come & Go 4 COLORS | PERFECT BINDING | COMPANY B | WEEKLY K |
| IMPOSITION TEMPLATE L | PRINTING PRESS C | 1160 × 940 | 1091 × 788 | 210 × 298 | Come & Go 4 COLORS | PERFECT BINDING | COMPANY C | SPECIAL-EDITION MAGAZINE L |
| IMPOSITION TEMPLATE M | PRINTING PRESS A | 1030 × 770 | 939 × 636 | 148 × 210 | Come & Go 4 COLORS | | COMPANY A | HANGING POSTER M |
| IMPOSITION TEMPLATE N | PRINTING PRESS B | 1030 × 770 | 939 × 636 | 148 × 210 | Come & Go 4 COLORS | SADDLE STITCHING | COMPANY B | PAMPHLET N |
| IMPOSITION TEMPLATE O | PRINTING PRESS C | 1030 × 770 | 939 × 636 | 148 × 210 | N-up SINGLE COLOR | | COMPANY A | POSTER O |
| ... | ... | ... | ... | ... | ... | ... | ... | ... |

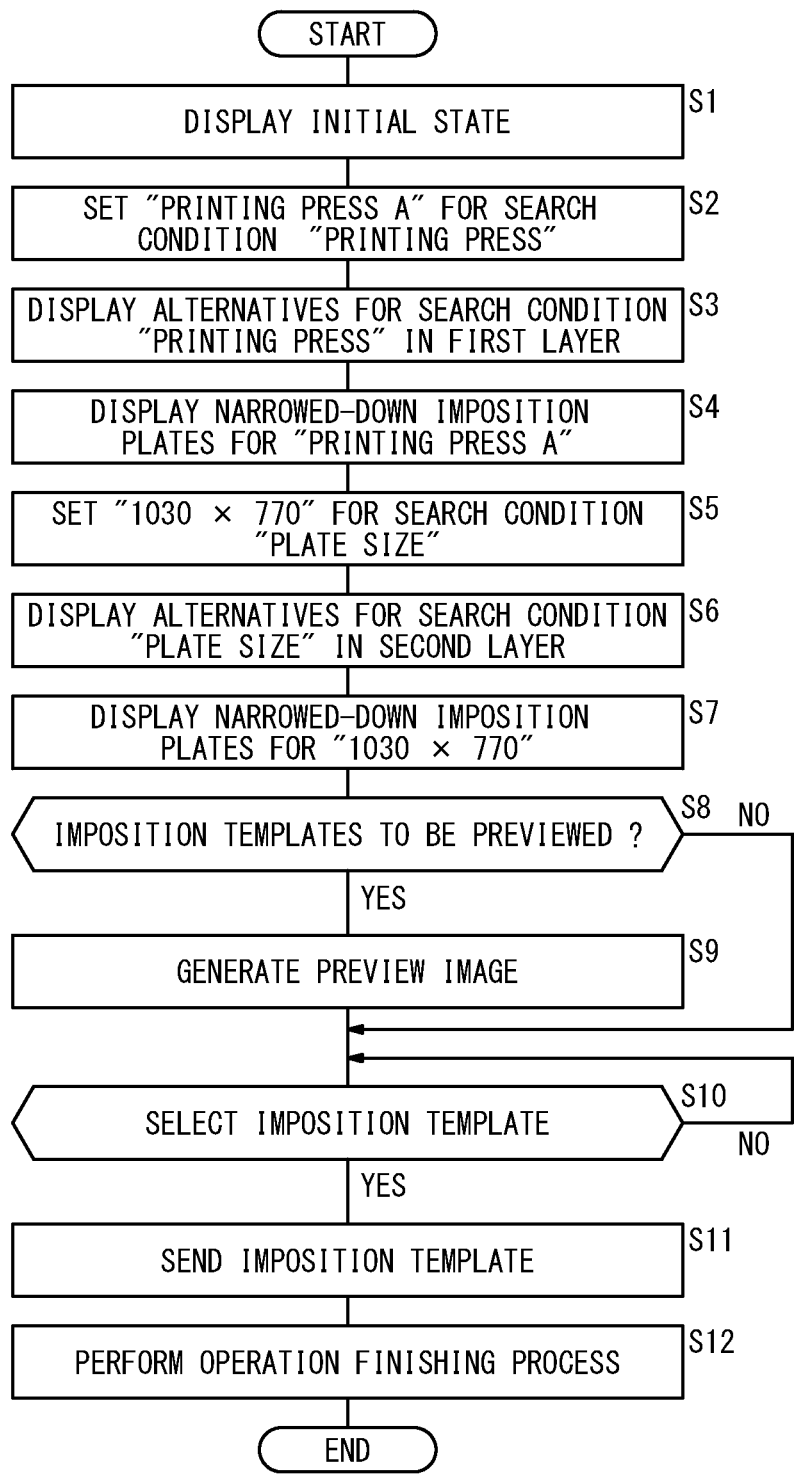

METHOD OF DISPLAYING, PROCESSING AND STORING SEARCH SCREEN INFORMATION IN A HIERACHICAL STRUCTURE

CROSS-REFERENCE TO RELATED APPLICATION

This application is based upon and claims the benefit of priority from Japanese Patent Application No. 2011-218490 filed on Sep. 30, 2011, of which the contents are incorporated herein by reference.

BACKGROUND OF THE INVENTION

1. Field of the Invention

The present invention relates to a method of displaying search screen information in order to display a search result processed by an information processing apparatus, a search screen information processing system, and a storage medium.

2. Description of the Related Art

Heretofore, information processing apparatus such as computers or the like operate in the following manner in a search mode. When the user of a computer enters a search condition through an input device such as a keyboard or a mouse, the computer performs a search process based on the entered search condition, and displays a search result on a display device.

For example, a CTP (Computer To Plate) system for producing printing plates controls a printing device in order to produce a print based on printing conditions that are established by a computer. The computer stores a plurality of printing conditions for generating detailed printing instructions, and the user of the computer searches for and establishes a desired printing condition in the computer (see Japanese Laid-Open Patent Publication No. 2004-206553, for example). More specifically, if the user enters certain information (search content information) into the computer, the computer searches for a printing condition based on the entered information, and displays the obtained printing condition as a search result. The term "enter" as used herein refers to not only entering contents of search conditions (search content information), but also to selecting search content information that has already been stored.

Although not disclosed in Japanese Laid-Open Patent Publication No. 2004-206553, it is customary to store, in a computer, a plurality of pieces of imposition template information with which a plurality of printing conditions are associated, and to search for a desired one of the stored pieces of imposition template information. The term "imposition template" refers to fixed information for guiding (applying) an imposition of print contents (jobs) produced by the user, and further includes information concerning printing conditions that cover a printing press, a plate size, a sheet size, etc. In other words, if the user selects a desired imposition template, the corresponding printing conditions are selected simultaneously therewith.

SUMMARY OF THE INVENTION

Heretofore, in the case that a user enters a plurality of items of information in a computer to search for an imposition template including printing conditions, the computer has displayed only a list of imposition templates.

It is the general practice for a computer, which provides printing instructions to a printing apparatus for producing prints such as magazines, flyers, etc., to store a number of imposition templates. If the user searches for imposition templates by changing the search conditions, then it is difficult for the user to grasp what kinds of imposition templates exist as a whole in searching for a desired imposition template. More specifically, if the user searches for imposition templates under a plurality of search conditions (search contents information) in the process of displaying a search screen according to the related art, then the user obtains only a list of imposition templates that are displayed by the computer, and is unable to determine relationships between the search conditions (search contents information). Therefore, if the user has searched for an imposition template under a certain search condition, and then the user wants to search for another imposition template under a revised search condition, for example, the user finds it difficult to determine which search condition needs to be changed.

It is an object of the present invention to provide a method of displaying search screen information, a search screen information processing system, and a storage medium with a program stored therein for processing search screen information, in which search contents information of a plurality of search conditions are displayed in a hierarchical structure, and wherein the hierarchical structure is changed appropriately based on a search sequence, to thereby allow the user to recognize easily the relationship of the search contents information for performing an efficient search process.

To achieve the above object, there is provided in accordance with the present invention a method of displaying search screen information with a display device for displaying the search screen information, an input device for entering a plurality of search conditions in the search screen information, and an information processing apparatus for acquiring a search result that agrees with entered search conditions, the information processing apparatus having a database of at least two data having search contents information related to the search conditions, wherein the search result acquired by the information processing apparatus is displayed in the search screen information, the method comprising the steps of displaying, as the search information, condition entry image information capable of entering the search contents information corresponding to the search conditions, displaying data from the database that agree with a plurality of entered pieces of the search contents information, and generating symbol image information having an identification label based on the search contents information, constructing layers according to an order in which the search conditions are entered, and displaying a plurality of pieces of the symbol image information based on the constructed layers.

With the above arrangement, layers are constructed according to the order in which the search conditions are entered, and a plurality of pieces of symbol image information are displayed based on the constructed layers. When the user searches for data, the user can easily confirm the symbol image information in a hierarchical structure as the search screen information. Further, the user can grasp how the symbol image information is related according to the order in which the search conditions are entered, i.e., how the search contents information is related. If data are searched for again, the searching process can be performed highly efficiently simply by entering search conditions based on the grasped relationship.

Preferably, the search conditions are further displayed as the search screen information according to the order in which the search conditions are entered.

Since the search conditions are displayed according to the order in which they are entered, the user can easily determine the layers of the search conditions.

Preferably, image information capable of identifying features of the at least two data is further displayed as the search screen information.

Since image information capable of identifying features of the at least two data is displayed, the user can observe the identifying image information and can easily find desired data.

The identifying image information can be displayed as scaled-down image information. Therefore, the processing burden on the information processing apparatus can be reduced.

Preferably, the method further comprises the steps of placing the plurality of pieces of the symbol image information in one layer, and selecting one of the pieces of the symbol image information in the one layer, and if another of the pieces of the symbol image information is selected while information in a layer lower than the symbol image information or data related thereto is being displayed, switching to information in a layer lower than the other of the pieces of the symbol image information or data related thereto.

Since any one of the pieces of the symbol image information in the one layer can be selected, and information in a layer lower than the symbol image information or data related thereto is switched, the user can gain direct access to the symbol image information displayed in the hierarchical structure, thereby facilitating a more efficient data search.

The symbol image information may comprise image information recognizable as a folder, and the identification label may be displayed as representing a name of the folder at a position near the image information recognizable as the folder.

Since image information of folders and names of the folders are displayed, the hierarchical structure is displayed in a manner similar to familiar folders that have heretofore been displayed by information processing apparatus such as computers. Thus, the user finds it easy and efficient to use the search screen information processing system.

The data may comprise an imposition template having a pattern for imposing contents to be printed and printing conditions for printing the imposition template, and the search screen information may be capable of entering the printing conditions of the data as the search conditions.

Since the data have an imposition template and printing conditions, in the case that printing conditions are entered as search conditions, it is easy for the user to search for an imposition template from among a number of imposition templates, which are prepared frequently for printing.

To achieve the above object, there also is provided a search screen information processing system comprising a display device for displaying search screen information, an input device for entering a plurality of search conditions in the search screen information, an information processing apparatus for acquiring a search result that agrees with entered search conditions, the information processing apparatus having a database of at least two data having search contents information related to the search conditions, wherein the search result acquired by the information processing apparatus is displayed in the search screen information, a condition entry screen display section for displaying, as the search screen information, condition entry image information capable of entering the search contents information corresponding to the search conditions, a search result display section for displaying data from the database that agree with a plurality of entered pieces of the search contents information, and a hierarchical structure display section for generating symbol image information having an identification label based on the search contents information, constructing layers according to an order in which the search conditions are entered, and displaying a plurality of pieces of the symbol image information based on the constructed layers.

To achieve the above object, there further is provided a computer-readable storage medium storing therein a program for displaying search screen information, entering a plurality of search conditions in the search screen information, acquiring a search result that agrees with entered search conditions entered from a database of at least two data having search contents information related to the search conditions, and displaying the acquired search result in the search screen information, the program enabling a computer to function as a condition entry screen display section for displaying, as the search screen information, condition entry image information capable of entering the search contents information corresponding to the search conditions, a search result display section for displaying data from the database that agree with a plurality of entered pieces of the search contents information, and a hierarchical structure display section for generating symbol image information having an identification label based on the search contents information, constructing layers according to an order in which the search conditions are entered, and displaying a plurality of pieces of the symbol image information based on the constructed layers.

According to the present invention, the search contents information of a plurality of search conditions is displayed in a hierarchical structure, and the hierarchical structure is appropriately changed based on a searching order. Therefore, the user is capable of easily recognizing how the search contents information is related, for thereby performing the searching process highly efficiently.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a table showing by way of example an imposition template database according to the embodiment;

FIG. 5 is a flowchart of an operation control sequence of a search control program of the search screen information processing system shown in FIG. 1;

DESCRIPTION OF THE PREFERRED EMBODIMENTS

A search screen information processing system and a storage medium with a program stored therein for processing search screen information in relation to a method for displaying search screen information according to a preferred embodiment of the present invention will be described in detail below with reference to the accompanying drawings.

The search screen information processing system according to the present embodiment is included in a printing system, which is constructed as a CTP system. The printing system includes a printing apparatus, which produces prints based on imposed data of jobs that are produced by and sent from a computer that serves as an information processing apparatus. The computer is operated by a user, or is operated automatically, in order to apply a job to an imposition template, which is stored (registered) as data, thereby producing imposed data. The imposition template includes printing conditions to be used when the printing apparatus produces a print. When the computer sends imposed data to the printing apparatus, the printing apparatus is set to the printing conditions, thereby making the printing apparatus ready to print. In this manner, the printing system operates efficiently.

A number of imposition templates under a plurality of printing conditions are stored in the computer. For producing a print, it is preferable for the user to search for a desired imposition template by narrowing down the stored printing conditions under a plurality of search conditions. The search screen information processing system includes a function to search for desired imposition templates, which is included in the printing system.

Figure 1:
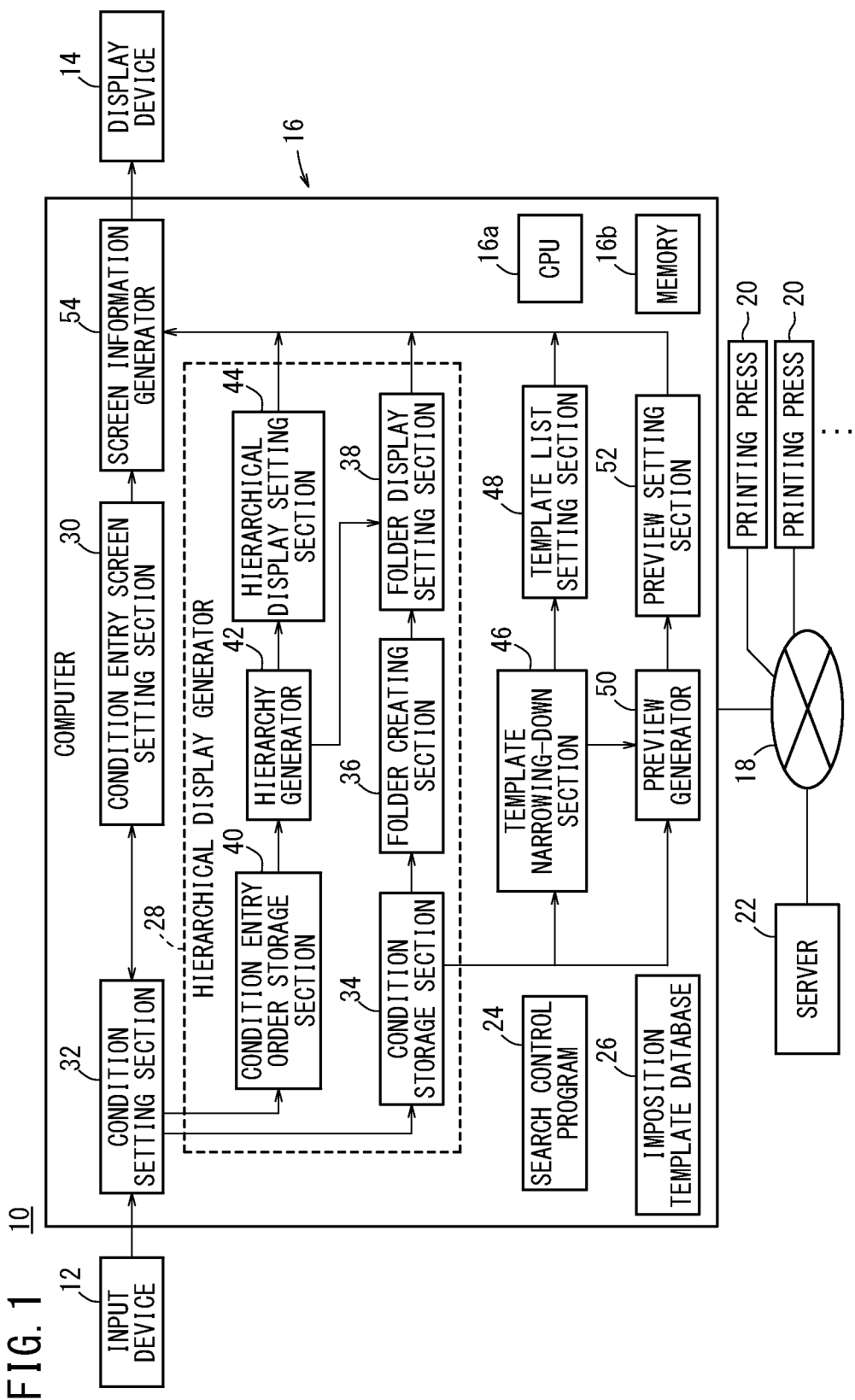
FIG. 1 is a block diagram showing an overall configuration of a search screen information processing system according to an embodiment of the present invention.

FIG. 1 shows in block form an overall configuration of a search screen information processing system 10 according to the present embodiment.

As shown in FIG. 1, the search screen information processing system 10 includes an input device 12, a display device 14, and a computer 16. The search screen information processing system 10 is connected to printing presses 20 and a server 22 through a network 18.

The input device 12 comprises a known keyboard, a known mouse, etc. The input device 12 is used by the user to enter characters, symbols, etc., into the computer 16, and also to move a pointer which is displayed on a monitor screen of the display device 14. The input device 12 may also comprise any of various other devices, e.g., a remote controller, a microphone, a touch panel, etc., for controlling the computer 16.

The display device 14 comprises a known display unit, e.g., a liquid crystal display unit, an organic EL (ElectroLuminescence) display unit, a plasma display unit, or the like, for displaying processed information from the computer 16. The search screen information processing system 10 displays search screen information 100 (see FIG. 3), to be described later, on the monitor screen of the display device 14.

In the search screen information processing system 10, the computer 16 serves as an apparatus that actually carries out a searching process. The computer 16 may comprise a general information apparatus including a CPU 16a, a memory 16b (storage medium), etc.

The network 18 is constructed based on communication standards such as Ethernet (registered trademark). The network 18 interconnects the computer 16, the printing presses 20, and the server 22. The network 18 allows various data to be sent and received by the computer 16, the printing presses 20, and the server 22, based on control instructions applied thereto.

The printing presses 20 are installed in a printing site such as a printer's factory. The printing presses 20 have printing plates, inks, etc., the characteristics of which are different from each other. The user selects one of the printing presses 20, which is optimum for printing imposed data, i.e., jobs (not shown). The computer 16 sends a printing instruction (imposed data) to a selected printing press 20, which produces a print based on the printing instruction. In the illustrated embodiment, the printing presses 20 and the computer 16 are provided as separate entities. However, the printing presses 20 and the computer 16 may be provided in other types of configurations. For example, functions of the computer 16 may be performed by operating systems of the printing presses 20.

The server 22 stores various pieces of information (data) to be used by the computer 16 for control of printing. The server 22 sends such stored pieces of information to the computer 16 and the printing presses 20 as required, or upon receiving a request. For example, the server 22 stores an imposition template database (DB), which is similar to a database of imposition templates T (see FIG. 2) (hereinafter referred to as an "imposition template DB 26") stored in the computer 16. The imposition template DB is updated by user settings and updates, as well as by additional information provided by the manufacturer of the printing presses 20, which are stored as the latest imposition template DB. Accordingly, the imposition template DB 26 stored in the computer 16 can be updated easily.

The imposition template DB 26 will be described in specific detail below. FIG. 2 is a table showing by way of example the imposition template DB 26.

As shown in FIG. 2, the imposition template DB 26 stores information concerning a plurality of imposition templates T. For illustrative purposes, the imposition templates T shown in FIG. 2 are named as imposition templates A though O.

The imposition templates T stored in the imposition template DB 26 are accompanied by ancillary printing conditions representing information concerning printing presses, plate sizes, sheet sizes, finished sizes, work styles, bindings, customer names, product names, etc. The computer 16 sends the printing conditions together with the imposed data (imposition templates T) to the printing presses 20, thereby establishing printing settings in the printing presses 20. Each of the printing conditions may also be used as a search condition that facilitates searching for an imposition template T.

Printing conditions will be described in detail below. The printing condition "PRINTING PRESS" represents information indicative of the relationship between the printing presses 20 and the imposition plates T. If the printing condition "PRINTING PRESS" refers to a printing press A, then an imposition template T for use with the printing press A is indicated.

The printing condition "PLATE SIZE" represents size information concerning a printing plate to be used to produce a print. Various plate sizes are available depending on the printing presses 20 and the printing plates. For example, medium octavo sizes for CTP printing plates, which are stored in the imposition template DB 26, include 896×715, 980×725, 1003×800, 1030×770, 1160×940, etc.

The printing condition "SHEET SIZE" represents information concerning sheets used for printing. Various sheet sizes that are stored in the imposition template DB 26 include A-series size, B-series size, duodecimo size, and medium octavo size (e.g. 1091×788, 939×636), etc.

The printing condition "FINISHED SIZE" represents information concerning sheet sizes for sheets with imposed jobs printed thereon. Finished sizes that are stored in the imposition template DB 26 include both A-series and B-series sizes (e.g., A4: 210×298, A5: 148×210).

The printing condition "WORK STYLE" represents information concerning the layout and colors of jobs on the imposition templates T.

The printing condition "BINDING" represents information concerning methods (perfect binding, saddle stitching, side stitching, etc.) for binding booklets that are to be produced as prints.

The printing condition "CUSTOMER NAME" represents information concerning companies and persons who have asked for prints. Customer names that are stored in the imposition template DB 26 include company names, personal names, etc.

The printing condition "PRODUCT NAME" represents information concerning prints produced by the printing process. Product names that are stored in the imposition template DB 26 include magazine names, plan names, etc.

As described above, the imposition templates T are stored in association with a plurality of printing conditions and are managed by the imposition template DB 26. The imposition template DB 26 is read at times depending on the processing operation of the computer 16, and is used to search for imposition templates T.

Figure 3:
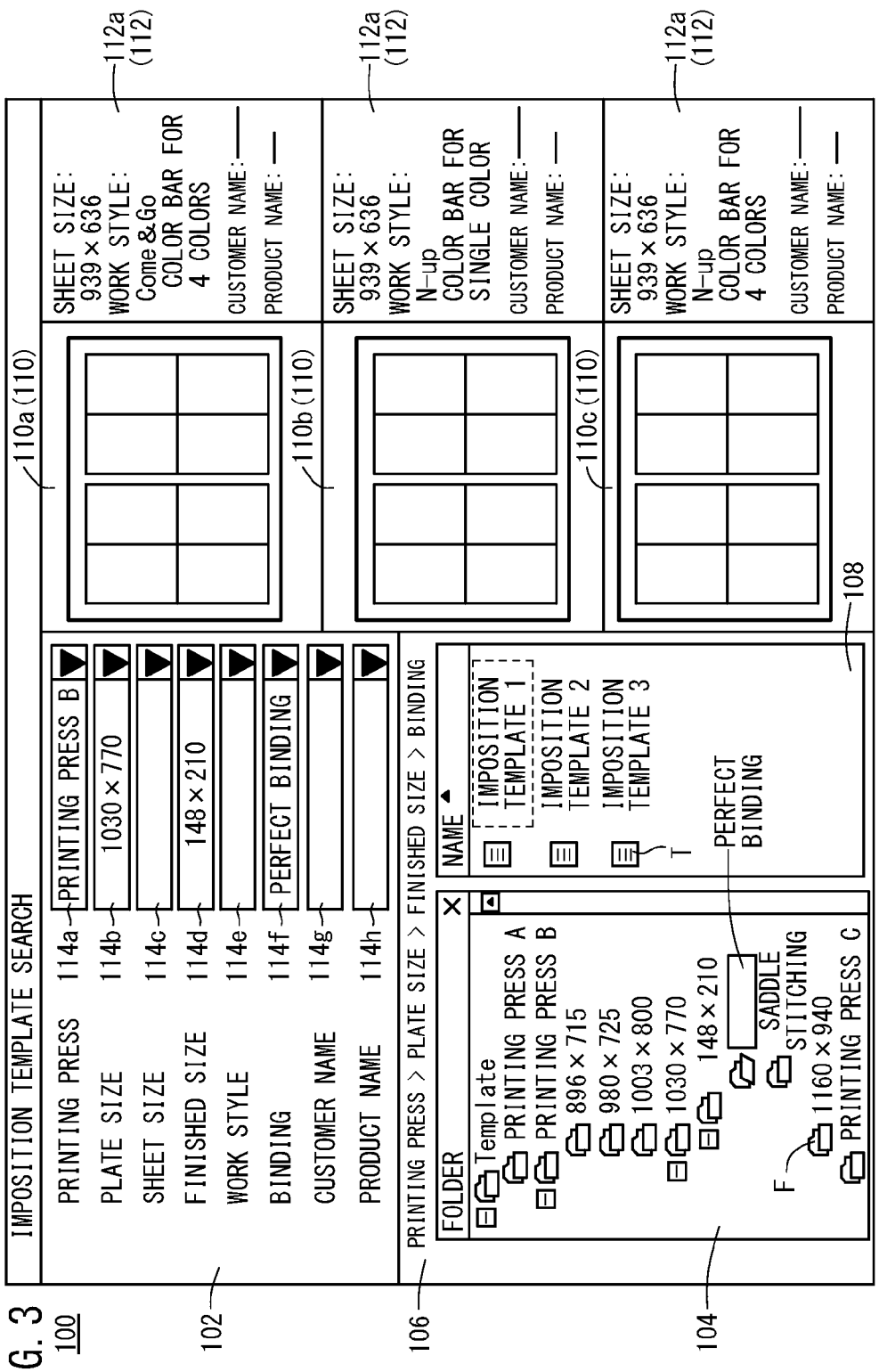
FIG. 3 is a view illustrative of search screen information that is displayed by the search screen information processing system shown in FIG. 1.

When an operation is carried out to search for an imposition template T, the computer 16 displays the search screen information 100 on the display device 14, so as to prompt the user to enter search conditions, and also subsequently displays search results. The search screen information 100 will be described in specific detail below. FIG. 3 is illustrative of search screen information 100 that is displayed by the search screen information processing system 10 shown in FIG. 1.

As shown in FIG. 3, the displayed search screen information 100 includes a plurality of divided areas. More specifically, the search screen information 100 includes a search condition menu display area 102 disposed in an upper left portion of the monitor screen, a tree format display area 104 disposed in a left portion of the monitor screen below the search condition menu display area 102, a condition entry order display area 106 disposed between the search condition menu display area 102 and the tree format display area 104, a search result display area 108 disposed on the ride side of the tree format display area 104 below the condition entry order display area 106, a preview display area 110 disposed on the right side of the search condition menu display area 102 and the search result display area 108, and a printing condition display area 112 disposed on the right side of the preview display area 110.

The search condition menu display area 102 is a display area in which the user enters search conditions. The search condition menu display area 102 has a vertical array of search conditions (eight search conditions in FIG. 3) in a left portion thereof, and a vertical array of dialog boxes 114a through 114h (eight dialog boxes in FIG. 3) in a right portion thereof, which correspond respectively to the search conditions.

The search conditions agree with printing conditions that are ancillary to the imposition templates T. More specifically, as shown in FIGS. 2 and 3, the search conditions, which include "PRINTING PRESS", "PLATE SIZE", "SHEET SIZE", "FINISHED SIZE", "WORK STYLE", "BINDING", "CUSTOMER NAME", and "PRODUCT NAME", are displayed in the search condition menu display area 102. Each of the dialog boxes 114a through 114h displays a selected one of a plurality of alternatives (search contents information) corresponding to one of the search conditions. For example, the alternatives "PRINTING PRESS A", "PRINTING PRESS B", and "PRINTING PRESS C" (search contents information) are stored for the printing condition "PRINTING PRESS", whereby the user can select a desired one of the printing presses by performing an operation in the dialog box 114a.

The tree format display area 104 is an area for displaying search conditions, which the user uses in a search process, in a hierarchical structure (tree format). The tree format display area 104 displays folder symbols (hereinafter simply referred to as "folders F") corresponding to alternatives (search contents information) for search conditions, and also displays alternatives (search contents information) as folder names to the right of the folders F. Depending on the order in which the search conditions are entered (set), layers are successively established, thereby creating a hierarchical structure, as shown in FIG. 3. A specific process of generating a hierarchical structure in the tree format display area 104 will be described later. The folders F displayed in the tree format display area 104 merely serve to allow the user to recognize folder names easily, and information concerning the folders F is not actually created by the computer 16.

The condition entry order display area 106 is an area for successively displaying search conditions that the user has entered. More specifically, the condition entry order display area 106 displays a search condition, which is initially selected in the search condition menu display area 102, as a first condition in a leftmost region of the condition entry order display area 106. Then, the condition entry order display area 106 displays a search condition, which is selected next in the search condition menu display area 102, as a second condition next to the first condition. At this time, an inequality sign > is displayed between the first and second conditions in order to enable the user to recognize easily the order in which the conditions have been entered.

The search result display area 108 is an area for displaying, as search results, imposition templates that the computer 16 has searched for using the imposition template DB 26, based on the search conditions entered by the user. More specifically, the search result display area 108 displays, as a search result, only those imposition templates T that agree with the search conditions. Therefore, the user can select one of the imposition templates T from among the imposition templates T that are listed in the search result display area 108, thereby setting a desired imposition template T.

The preview display area 110 is an area for displaying a plurality of previews (three in FIG. 3) of imposition templates T respectively in a plurality of preview display areas 110a through 110c, either automatically or according to an instruction from the user. Previews of imposition templates T can quickly be displayed in the preview display area 110 if imposition frames and page number information are extracted for display from among the imposition templates T that are stored in the storage unit of the computer 16.

The preview display area 110 is related to the search result display area 108, such that the preview display area 110 will display previews of imposition templates T that are listed in the search result display area 108. If four or more imposition templates T are listed in the search result display area 108, then the preview display area 110 may display previews of three higher-level imposition templates T. Alternatively, the user may select imposition templates T the previews of which are to be confirmed, whereupon the preview display area 110 displays the previews of the selected imposition templates T.

The printing condition display area 112 is an area for displaying, in respective printing condition display areas 112a, printing conditions for the imposition templates T, the previews of which have been displayed in the preview display area 110. Since the printing conditions are displayed next to the displayed previews of the imposition templates T, the user can easily confirm the printing conditions in relation to the imposition templates T. The printing condition display area 112 preferably displays printing conditions for imposition templates T that have not already been selected as search conditions. Thus, the user can confirm the printing conditions, which have not been selected by the user, together with the previews of the imposition templates T, so that the user can efficiently select a desired imposition template T.

As shown in FIG. 1, the computer 16 stores a search control program 24 and the imposition template DB 26 in the memory 16b in order to generate the search screen information 100. For performing a search process on the imposition templates T, the CPU 16a of the computer 16 activates and executes the search control program 24 to display the search screen information 100 on the monitor screen of the display device 14.

Upon activation of the search control program 24, the search control program 24 constructs various processors and storage sections in the computer 16 for carrying out the search process. As the search process progresses, the search control program 24 changes details of the displayed search screen information 100. The processors and storage sections, which are constructed as functional units upon execution of the search control program 24, include a hierarchical display generator 28, a condition entry screen setting section 30, a condition setting section 32, a template narrowing-down section 46, a template list setting section 48, a preview generator 50, a preview setting section 52, and a screen information generator 54. The hierarchical display generator 28 includes a condition storage section 34, a folder creating section 36, a folder display setting section 38, a condition entry order storage section 40, a hierarchy generator 42, and a hierarchical display setting section 44.

Figure 4A:
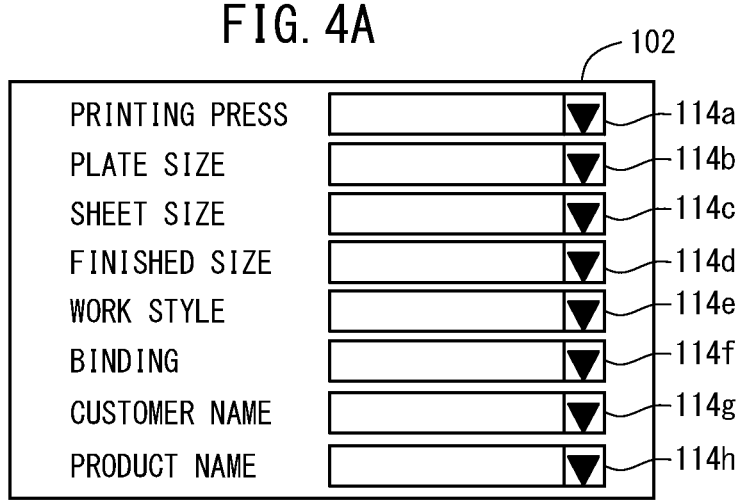
FIG. 4A is a view showing a search condition menu display area of the search screen information shown in FIG. 3.
Figure 4B:
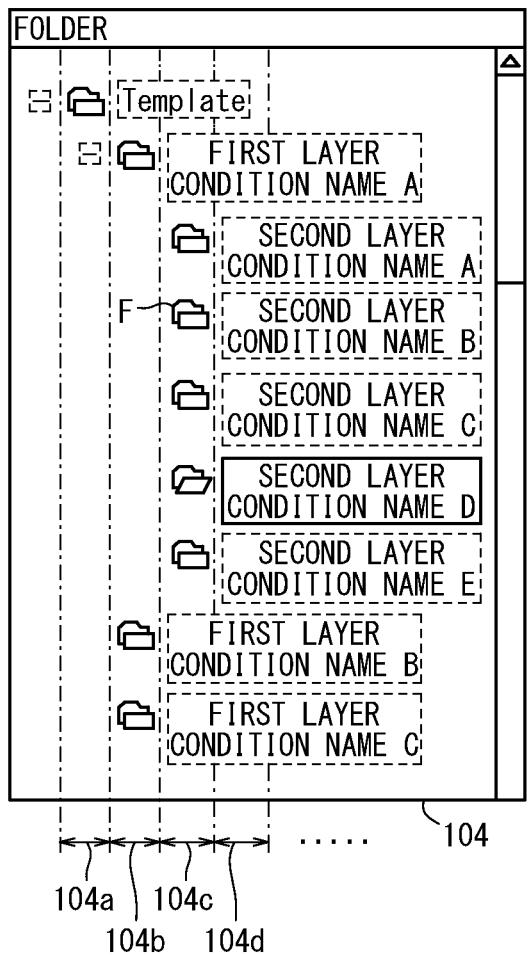
FIG. 4B is a view showing a tree format display area of the search screen information shown in FIG. 3.
Figure 4C:
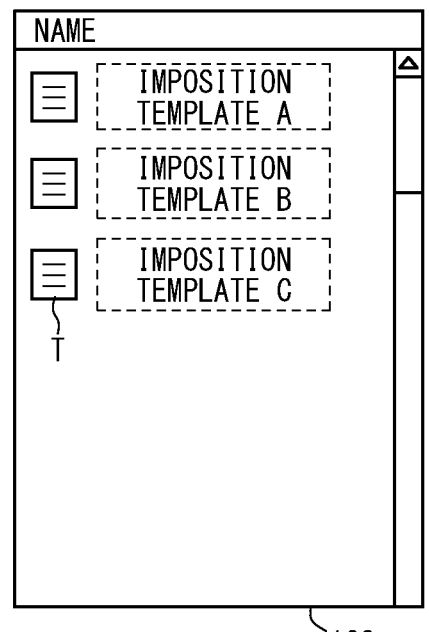
FIG. 4C is a view showing a search result display area of the search screen information shown in FIG. 3.

The processors and the storage sections constructed in the computer 16 will be described below with reference to FIGS. 1 and 4A through 4C. FIG. 4A shows the search condition menu display area 102 shown in FIG. 3, FIG. 4B shows the tree format display area 104 shown in FIG. 3, and FIG. 4C shows the search result display area 108 shown in FIG. 3.

The condition entry screen setting section 30 includes a function to produce a display of the search condition menu display area 102. More specifically, depending on the printing conditions for the imposition templates T, the condition entry screen setting section 30 sets search conditions (illustrated in a left portion of FIG. 4A), places dialog boxes 114a through 114h corresponding to the search conditions, and sets alternatives (search contents information) in the dialog boxes 114a through 114h.

The condition entry screen setting section 30 is connected respectively to the condition setting section 32 and the screen information generator 54. The condition entry screen setting section 30 sends image information of the search condition menu display area 102 to the screen information generator 54. If the user operates one of the dialog boxes for the search conditions, the condition entry screen setting section 30 sends information of the operated search condition (the search condition and the alternatives: hereinafter simply referred to as "search condition information") to the condition setting section 32.

The condition setting section 32 is connected to the input device 12, the condition storage section 34, and the condition entry order storage section 40, as well as to the condition entry screen setting section 30. The condition setting section 32 receives search conditions, which are entered (selected) by the user through the input device 12, and stores (sets) the received search conditions in the condition storage section 34 and the condition entry order storage section 40. At this time, the condition setting section 32 sends information concerning the operation contents of the user to the condition entry screen setting section 30, and receives search condition information from the condition entry screen setting section 30. The condition entry screen setting section 30 reflects the operation contents in a given dialog box, in order to display the alternative (search contents information) that is selected by the user (see also FIGS. 6A through 8C).

A process of displaying the tree format display area 104 and the condition entry order display area 106 will be described below. Display of the tree format display area 104 and the condition entry order display area 106 is produced and carried out by the hierarchical display generator 28.

The condition storage section 34 stores search condition information sent from the condition setting section 32. The condition storage section 34 stores not only alternatives for the search conditions selected by the user, but also all alternatives for the search conditions. The stored search condition information is read from the condition storage section 34 into the folder creating section 36 and the template narrowing-down section 46, and is used during execution of the processing sequences thereof.

Upon the folder creating section 36 reading the search condition information from the condition storage section 34, the folder creating section 36 creates folders F of all alternatives (e.g., "PRINTING PRESS A", "PRINTING PRESS B", "PRINTING PRESS C") corresponding to the search condition (e.g., "PRINTING PRESS"). The names of the folders F reflect the names of the alternatives. Therefore, all the alternatives related to the search conditions can be displayed as folders.

The condition setting section 32 successively sends the search conditions selected by the user to the condition entry order storage section 40. The condition entry order storage section 40 stores the order in which the search conditions are entered (hereinafter also referred to as "entry order information"). The stored entry order information is read from the condition entry order storage section 40 into the hierarchy generator 42, and is used during execution of the processing sequence thereof.

Upon the hierarchy generator 42 reading the entry order information from the condition entry order storage section 40, the hierarchy generator 42 generates a hierarchical structure based on the read entry order information. More specifically, as shown in FIG. 4B, the hierarchy generator 42 successively generates layers depending on the entry order of the search conditions, across respective columns of the tree format display area 104.

More specifically, an initial folder having the name "Template" is placed in a top-level layer 104*a*, and a search condition selected for the first time (hereinafter referred to as a "first condition") is placed in a first layer 104*b*, which is adjacent to the top-level layer 104*a*. A search condition selected for the second time (hereinafter referred to as a "second condition") is placed in a second layer 104*c*, which is adjacent to the first layer 104*b*. A search condition selected for the third time (hereinafter referred to as a "third condition") is placed in a third layer 104*d*, which is adjacent to the second layer 104*c*. In this manner, layers are successively generated across respective columns of the tree format display area 104.

Information concerning the folders F created by the folder creating section 36, and information concerning the layers generated by the hierarchy generator 42 are sent to the folder display setting section 38. Upon receipt of such information, the folder display setting section 38 generates a hierarchical structure in the tree format display area 104.

More specifically, based on the information from the folder creating section 36 and the hierarchy generator 42, the folder display setting section 38 places folders that designate alternatives (search contents information) of the search condition as the first condition in the first layer 104*b*. As shown in FIG. 4B, the names of the alternatives are displayed as first layer condition names A through C.

Then, the information from the folder creating section 36 and the hierarchy generator 42 is sent again to the folder display setting section 38. Based on the information from the folder creating section 36 and the hierarchy generator 42, the folder display setting section 38 places folders that designate alternatives (search contents information) of the search condition as the second condition in the second layer 104*c*. As shown in FIG. 4B, the names of the alternatives for the second condition are displayed as second layer condition names A through E.

The folder display setting section 38 generates image information for the tree format display area 104 each time that a search condition is entered, and sends the image information to the screen information generator 54.

Information of the first condition, information of the second condition, and information of successive conditions are sent successively from the hierarchy generator 42 to the hierarchical display setting section 44 of the hierarchical display generator 28. Upon receipt of information for the first condition, the hierarchical display setting section 44 displays the search condition based on the first condition. Upon receipt of information for the second condition, the hierarchical display setting section 44 displays the search condition based on the second condition, with an inequality sign > being added next to the search condition that designates the first condition. Subsequently, the hierarchical display setting section 44 displays the search conditions selected by the user.

Upon receipt of the search condition information from the condition storage section 34, the template narrowing-down section 46 refers to the imposition template DB 26, and then narrows down (searches for) printing conditions that match the search condition information. In this manner, only imposition templates T that agree with the search conditions selected by the user are extracted, and information of the extracted imposition templates T is sent to the template list setting section 48 and the preview generator 50.

The template list setting section 48 produces a display screen for the search result display area 108. More specifically, upon receipt of the information of the extracted imposition templates T from the template narrowing-down section 46, the template list setting section 48 produces a list of imposition templates T that match the search conditions based on the received information.

The preview generator 50 produces a preview image. More specifically, upon receipt of the information of the extracted imposition templates T from the template narrowing-down section 46, the preview generator 50 produces preview information (i.e., frames of the imposition templates T and the number of pages) from the received information of the extracted imposition templates T. At the same time, the preview generator 50 reads the search condition information stored in the condition storage section 34, and while referring to the search condition information and the imposition template DB 26, extracts remaining information of printing conditions (search conditions) which have not been selected.

Upon receipt of the preview information and the remaining information from the preview generator 50, the preview setting section 52 produces a display screen of the preview display area 110 and the printing condition display area 112. The produced display screen (the preview display area 110 and the printing condition display area 112) is sent from the preview setting section 52 to the screen information generator 54.

The screen information generator 54 ultimately generates search screen information 100, which is displayed on the monitor screen of the display device 14. More specifically, the screen information generator 54 generates screen information (see FIG. 3) represented as a combination of the search condition menu display area 102 based on the information from the condition entry screen setting section 30, the tree format display area 104 based on the information from the folder display setting section 38, the condition entry order display area 106 based on the information from the hierarchical display setting section 44, the search result display area 108 based on the information from the template list setting section 48, as well as the preview display area 110 and the printing condition display area 112 based on the information from the preview setting section 52.

Figure 6A:
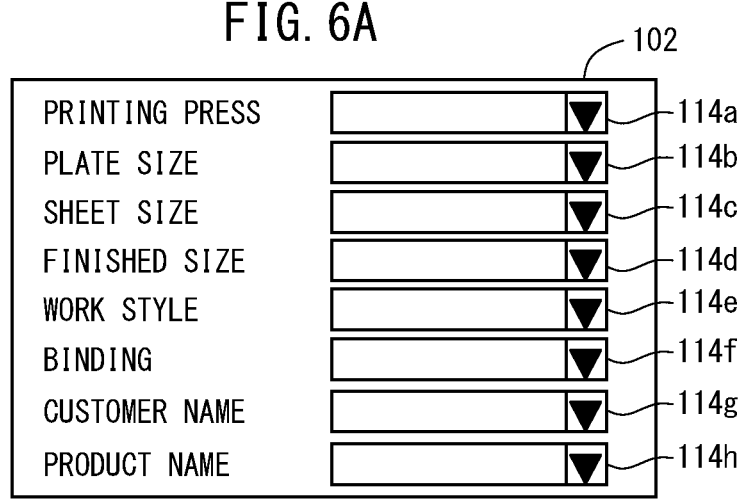
FIG. 6A is a view of the search condition menu display area shown in FIG. 4A before search conditions are entered.
Figure 6B:
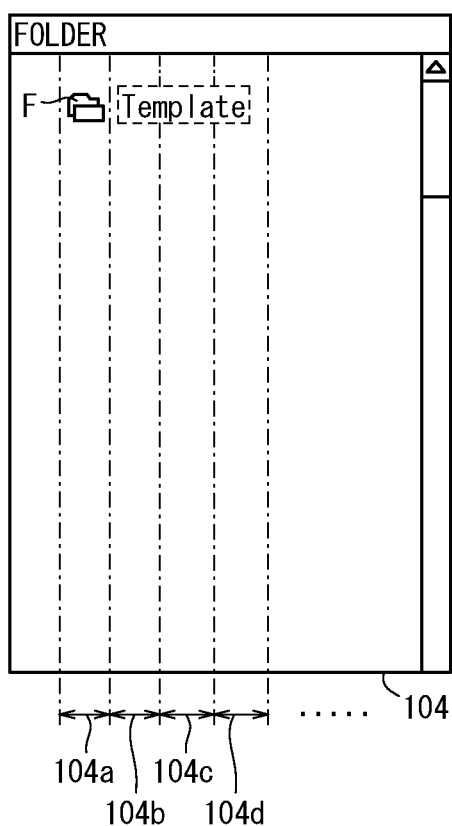
FIG. 6B is a view of the tree format display area shown in FIG. 4B before search conditions are entered.
Figure 6C:
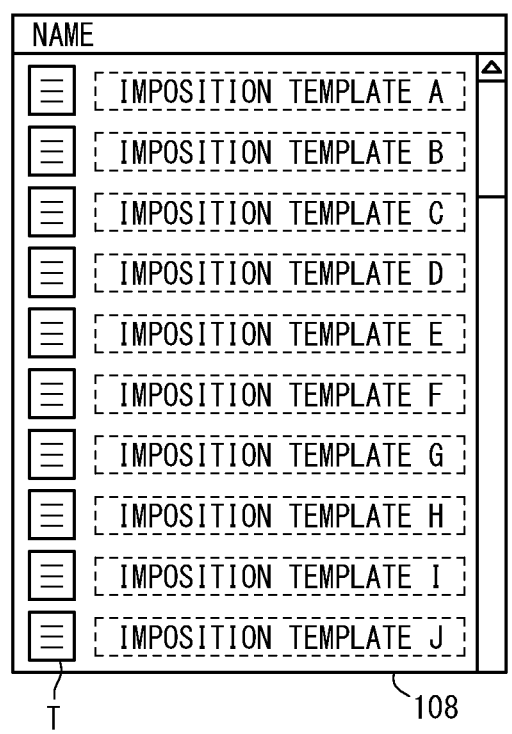
FIG. 6C is a view of the search result display area shown in FIG. 4C before search conditions are entered.
Figure 7A:
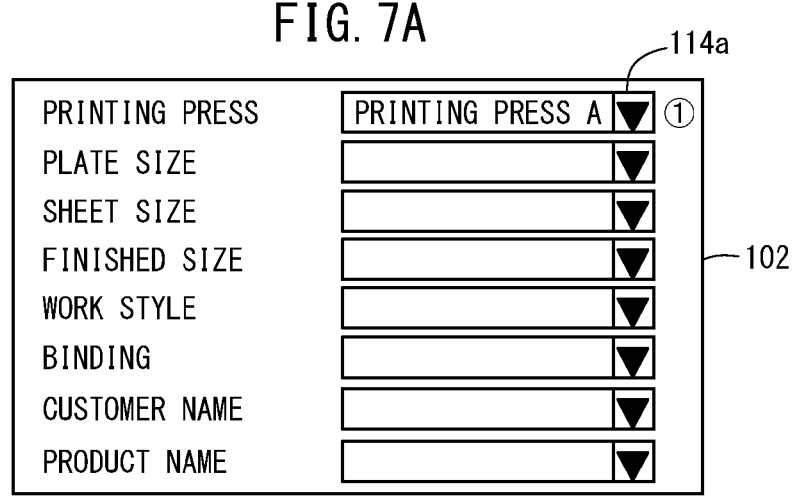
FIG. 7A is a view of the search condition menu display area shown in FIG. 6A having a first search condition entered therein.
Figure 7B:
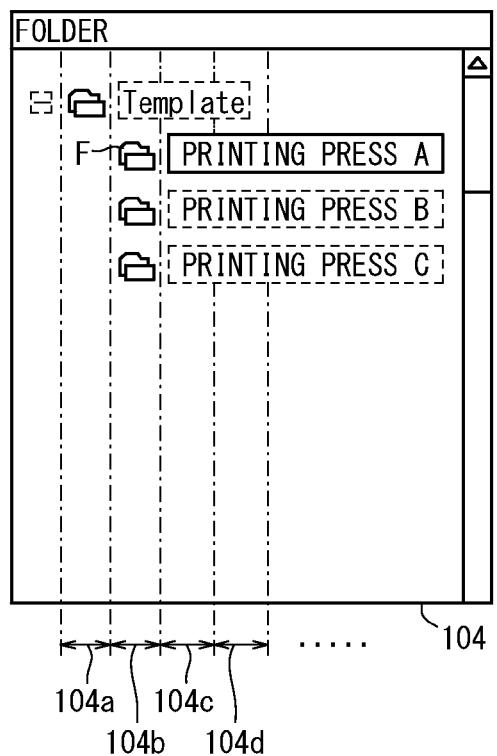
FIG. 7B is a view of the tree format display area shown in FIG. 6B having the first search condition entered therein.
Figure 7C:
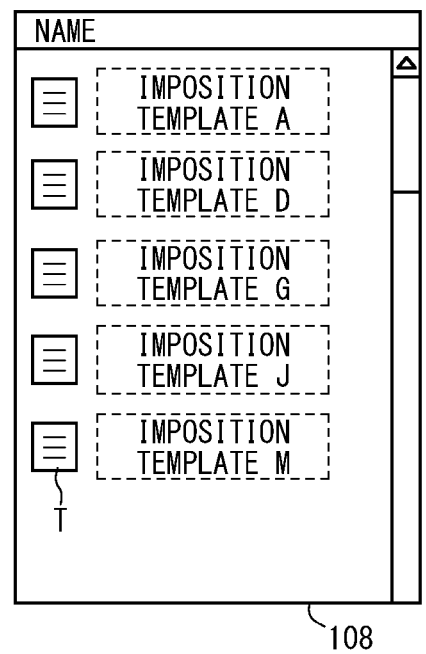
FIG. 7C is a view of the search result display area shown in FIG. 6C having the first search condition entered therein.
Figure 8A:
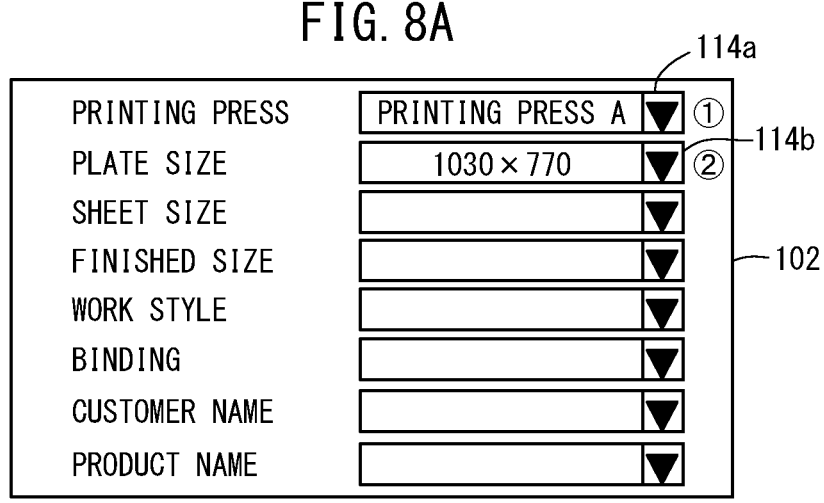
FIG. 8A is a view of the search condition menu display area shown in FIG. 7A having a second search condition entered therein.
Figure 8B:
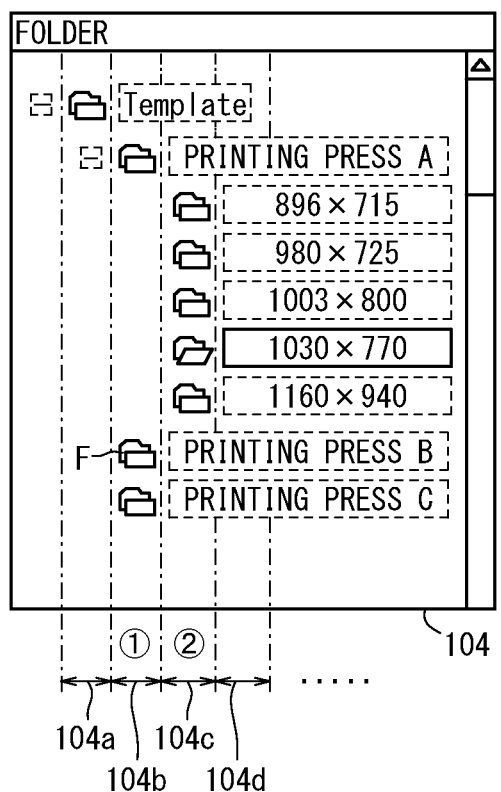
FIG. 8B is a view of the tree format display area shown in FIG. 7B having the second search condition entered therein.
Figure 8C:
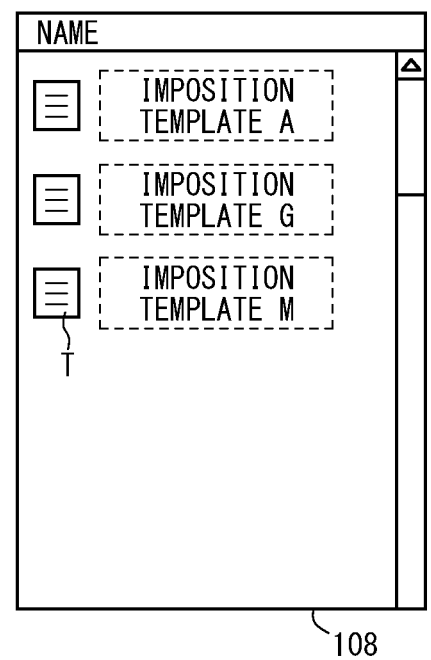
FIG. 8C is a view of the search result display area shown in FIG. 7C having the second search condition entered therein.

The search screen information processing system 10 according to the present embodiment is basically constructed as described above. Operations of the search screen information processing system 10 will be described below. FIG. 5 is a flowchart of an operation control sequence of a search control program of the search screen information processing system 10 shown in FIG. 1. FIG. 6A is a view of the search condition menu display area 102 shown in FIG. 4A before search conditions are entered therein. FIG. 6B is a view of the tree format display area 104 shown in FIG. 4B before search conditions are entered therein. FIG. 6C is a view of the search result display area 108 shown in FIG. 4C before search conditions are entered therein. FIG. 7A is a view of the search condition menu display area 102 shown in FIG. 6A having a first search condition entered therein. FIG. 7B is a view of the tree format display area 104 shown in FIG. 6B having the first search condition entered therein. FIG. 7C is a view of the search result display area 108 shown in FIG. 6C having the first search condition entered therein. FIG. 8A is a view of the search condition menu display area 102 shown in FIG. 7A having a second search condition entered therein. FIG. 8B is a view of the tree format display area 104 shown in FIG. 7B having the second search condition entered therein. FIG. 8C is a view of the search result display area 108 shown in FIG. 7C having the second search condition entered therein.

For producing prints on the printing presses 20, the user operates the input device 12 in order to cause the computer 16 to activate the search control program 24. The computer 16 starts to carry out an operation control sequence for the search control program 24, e.g., the operation control sequence shown in FIG. 5. The operation control sequence for the search control program 24, which is described below, is given only as one example of a display method (display process) according to the present invention. Various search conditions and alternatives can freely be established at the user's discretion.

First, the computer 16 (screen information generator 54) displays an initial state of the search screen information 100 on the monitor screen of the display device 14 (step S1 shown in FIG. 5). At this time, as shown in FIG. 6A, the search condition menu display area 102 includes search conditions ("PRINTING PRESS", "PLATE SIZE", "SHEET SIZE", "FINISHED SIZE", "WORKSTYLE", "BINDING", "CUSTOMER NAME", and "PRODUCT NAME") and dialog boxes 114a through 114h, which are displayed side by side. Initially, the dialog boxes 114a through 114h are left blank with no selections indicated therein.

As shown in FIG. 6B, the tree format display area 104 includes only the folder "Template", which is displayed in the top-level layer 104a. In the initial state, nothing is displayed in the condition entry order display area 106, the preview display area 110, and the printing condition display area 112, since no search conditions and no imposition templates T have been selected. As shown in FIG. 6C, since no search conditions have been selected, the search result display area 108 includes a list of all of the imposition templates T displayed therein.

Then, the user operates the input device 12 in order to click on the dialog box 114a that is related to the search condition "PRINTING PRESS", thereby setting "PRINTING PRESS A" as a first search condition (step S2 in FIG. 5). At this time, the condition entry screen setting section 30 displays "PRINTING PRESS A" in the dialog box 114a (see FIG. 7A). The condition setting section 32 stores (sets) the selected information "PRINTING PRESS A" in the condition storage section 34, and stores (sets) the search condition "PRINTING PRESS" as a first condition in the condition entry order storage section 40.

The hierarchical display generator 28 generates folders F under the names "PRINTING PRESS A", "PRINTING PRESS B'''", and "PRINTING PRESS C", which have been designated as alternatives for the search condition "PRINTING PRESS", and places (displays) the generated folders F as an array in the first layer 104b (step S3 in FIG. 5, see FIG. 7B). The hierarchical display generator 28 also displays the first condition (search condition) "PRINTING PRESS" in the condition entry order display area 106.

The template list setting section 48 displays imposition templates T that match the alternative "PRINTING PRESS A" (step S4 in FIG. 5, see FIG. 7C). More specifically, the template narrowing-down section 46 refers to the alternatives for "PRINTING PRESS A", which are stored in the condition storage section 34, and narrows down the imposition templates T stored in the imposition template DB 26. The imposition template DB 26 is narrowed down to (i.e., searched for) the imposition templates A, D, G, J, and M, which contain information in relation to "PRINTING PRESS A". The narrowed-down result, which represents the imposition templates A, D, G, J, and M, is sent to the template list setting section 48, which displays a list of the imposition templates A, D, G, J, M in the search result display area 108.

Then, the user operates the input device 12 in order to click on the dialog box 114b, thereby setting "1030×770" as a second search condition (step S5 in FIG. 5). At this time, the dialog box 114b displays "1030×770" (see FIG. 8A). The condition setting section 32 stores (sets) the selected information "1030×770" in the condition storage section 34, and stores (sets) the search condition "PLATE SIZE" as a second condition in the condition entry order storage section 40.

The hierarchical display generator 28 generates folders F under the names of "896×715", "980×725", . . . , "1160×940", which have been designated as alternatives for the search condition "PLATE SIZE", and places (displays) the generated folders F as an array in the second layer 104c under the folder F "PRINTING PRESS A" (step S6 in FIG. 5, see FIG. 8B). The hierarchical display generator 28 also displays the second condition "PLATE SIZE" next to the first condition "PRINTING PRESS", with the symbol ">" interposed therebetween, in the condition entry order display area 106.

The template list setting section 48 displays imposition templates T, which match the alternative "1030×770" (step S7 in FIG. 5, see FIG. 8C). More specifically, in addition to "PRINTING PRESS A", the template narrowing-down section 46 refers to the alternatives for "1030×770" stored in the condition storage section 34, and narrows down the imposition templates T stored in the imposition template DB 26. The imposition template DB 26 is narrowed down to (searched for) the imposition templates A, G, and M, which include information in relation to "PRINTING PRESS A" and "1030×770". The narrowed-down result, which represents the imposition templates A, G, and M, is sent to the template list setting section 48, which displays a list of the imposition templates A, G, M in the search result display area 108. Thus, the user can judge whether or not additional printing conditions should be established, based on the number of imposition templates T displayed in the search result display area 108.

Based on an operation by the user of the input device 12, the computer 16 then judges whether or not the imposition templates T should be previewed (step S8 in FIG. 5). If there is a preview instruction from the user, then control proceeds from step S8 to step S9. If there is not a preview instruction from the user, then control proceeds from step S8 to step S10.

In step S9, the preview generator 50 reads the imposition templates T based on the narrowed-down result from the template narrowing-down section 46, and generates a preview image. For example, as shown in FIG. 7C, if the imposition template DB 26 has been narrowed down to three imposition templates T, then the preview generator 50 generates a preview image of the three imposition templates T, and the preview image is displayed in the preview display area 110. The preview generator 50 also determines printing conditions that have not been searched for (not selected), based on the narrowed-down result, and displays the printing conditions that have not been searched for in the printing condition display area 112, in association with the imposition templates T displayed in the preview display areas 110a through 110c.

The computer 16 judges whether or not the user has selected one of the imposition templates T that are displayed in the search result display area 108 (step S10 in FIG. 5).

If the user has selected one of the imposition templates T, the computer 16 prompts the user, in another displayed window, to determine finally whether the selected imposition template T should be sent to the printing press 20. In response to an instruction from the user to send the selected imposition template T to the printing press 20, the computer 16 sends the imposition template T to the printing press 20 (step S11 in FIG. 5). At this time, the desired imposition template T is set in the printing press 20, which then performs a preparatory process and thereafter a printing process.

Finally, the computer 16 performs an operation finishing process under the search control program 24 (step S12 in FIG. 5), after which the operation control sequence is brought to an end.

As described above, as the user successively enters search conditions into the computer 16, i.e., the search control program 24, the computer 16 creates folders F representative of alternatives (search screen information) for the search conditions, and places the created folders F in a hierarchical structure (tree format) depending on the order in which the search conditions are entered. The hierarchical structure, in which alternatives for the search conditions are related to each other, is displayed in the tree format display area 104. According to the operation control sequence including steps S1 through S12, a hierarchical structure (tree format) is constructed, which includes the search condition "PRINTING PRESS" in a top-level layer, and the search condition "PLATE SIZE" in a layer arranged beneath the top-level layer.

Figure 9A:
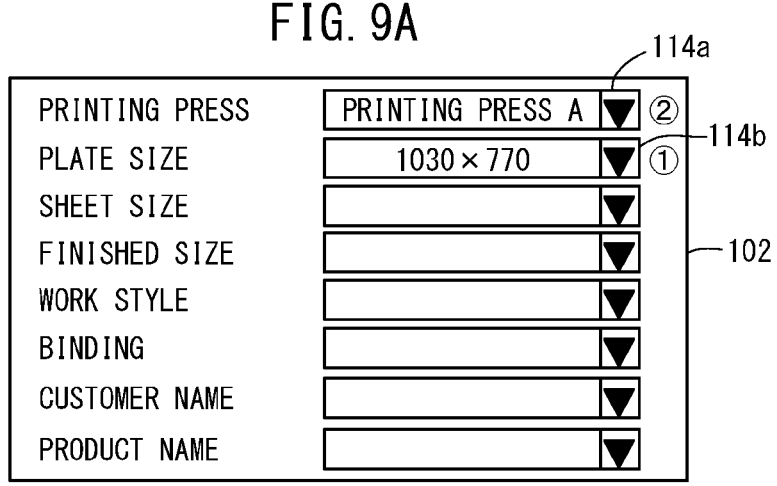
FIG. 9A is a view of the search condition menu display area having the search conditions shown in FIGS. 7A and 8A entered therein in a different order.
Figure 9B:
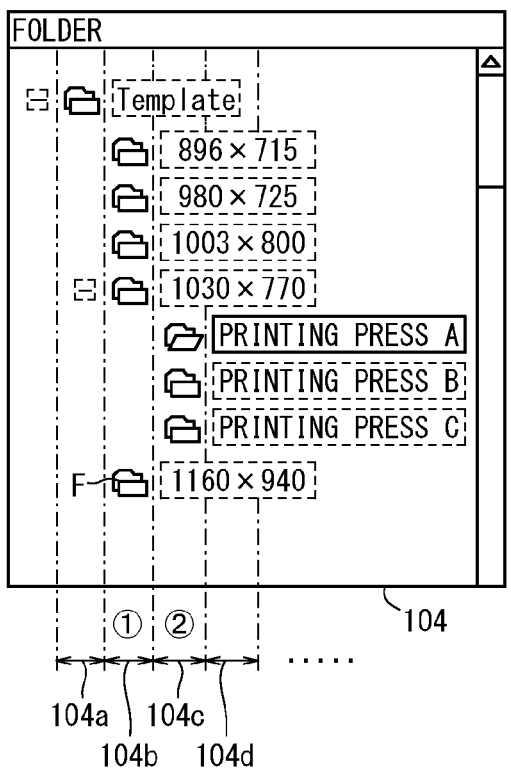
FIG. 9B is a view of the tree format display area having the search conditions shown in FIGS. 7A and 8A entered therein in a different order.
Figure 9C:
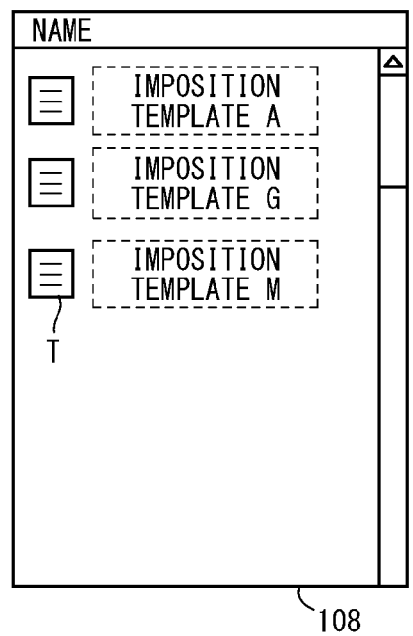
FIG. 9C is a view of the search result display area having the search conditions shown in FIGS. 7A and 8A entered therein in a different order.

FIG. 9A is a view of the search condition menu display area 102 having the search conditions in FIGS. 7A and 8A entered in a different order. FIG. 9B is a view of the tree format display area 104 having the search conditions in FIGS. 7A and 8A entered in a different order. FIG. 9C is a view of the search result display area 108 having the search conditions in FIGS. 7A and 8A entered in a different order.

If the search condition entry order "PRINTING PRESS"→"PLATE SIZE" is changed to the search condition entry order "PLATE SIZE"→"PRINTING PRESS", then the contents displayed in the search condition menu display area 102 and the search result display area 108 remain unchanged, however, the contents displayed in the tree format display area 104 are significantly changed. More specifically, as shown in FIG. 9A, even if the search condition entry order is changed, in the case that the two search conditions "PRINTING PRESS" and "PLATE SIZE" are selected, the search condition menu display area 102 displays "PRINTING PRESS A" and "1030×770" in the same manner as in the search condition menu display area 102 shown in FIG. 8A. Similarly, as shown in FIG. 9C, in the case that the two search conditions "PRINTING PRESS" and "PLATE SIZE" are selected, since the same narrowing-down process (search process) is carried out, the search result display area 108 displays the imposition templates A, G, B in the same manner as in the search result display area 108 shown in FIG. 8C.

In the tree format display area 104, however, as shown in FIG. 9B, folders F under the names "896×715", "980×725", ..., "1160×940", which have been designated as alternatives for the search condition "PLATE SIZE", are placed as an array in the first layer 104b, and folders F under the names "PRINTING PRESS A", "PRINTING PRESS B", "PRINTING PRESS C", which have been designated as alternatives for the search condition "PRINTING PRESS", are placed as an array in the second layer 104c. Therefore, the tree format display area 104 shown in FIG. 9B differs from the tree format display area 104 shown in FIG. 8B, and allows the user to determine easily which search conditions have been selected preferentially.

The hierarchical display of preferentially selected search conditions is highly advantageous, particularly if a comparatively large number (100 or more) of imposition templates T are stored, and if several (three or more) search conditions are entered in order to search for the search imposition templates T. More specifically, heretofore, after the user has entered a number of search conditions, the user tends to forget which of the search conditions have preferentially been selected, and hence the user often is likely to perform the entire search process all over again if it becomes necessary to search for imposition templates T a second time.

However, because the alternatives for the selected conditions are displayed in a tree format, the search screen information processing system 10 (display method) according to the present embodiment allows the user to recognize easily which search conditions have been selected preferentially, or how the selected alternatives are related to other unselected alternatives. Consequently, the efficiency with which imposition templates T can be searched is significantly increased.

A process of changing printing conditions, after a hierarchical structure of folders F has been constructed (step S7 and subsequent steps in FIG. 5) in the tree format display area 104, will be described below. For facilitating understanding of the process, it will hereinafter be assumed that printing conditions are denoted by A, B, C, alternatives (search contents information) for each of the printing conditions A, B, C are denoted by a, b, c, and that folders F for search contents information are specified by the printing conditions A, B, C and the alternatives a, b, c interconnected by hyphens, e.g., the folders F are indicated as folders A-a, A-b, and A-c, etc.

Figure 10A:
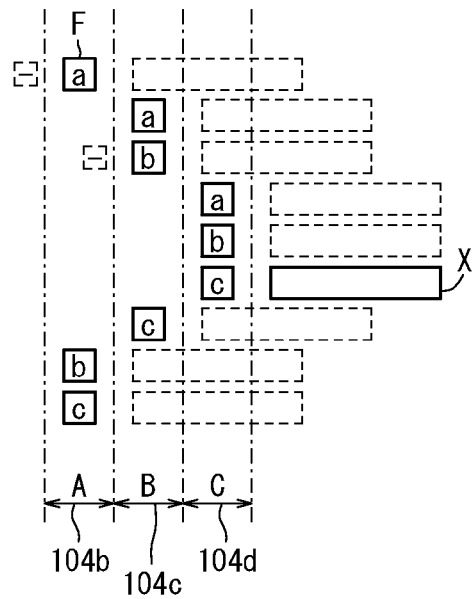
FIG. 10A is a view illustrative of a hierarchical structure of three search conditions A, B, and C each having three alternatives a, b, and c.
Figure 10B:
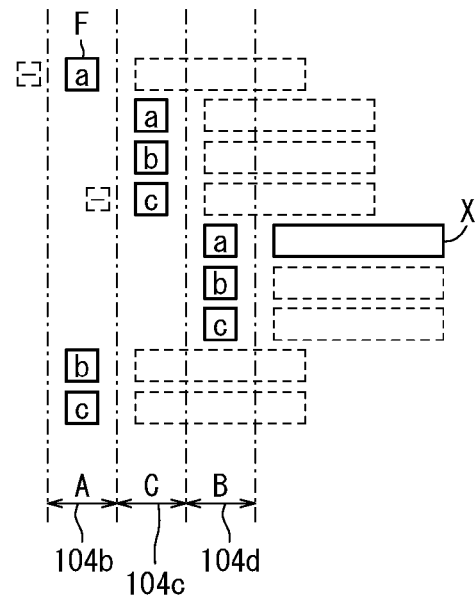
FIG. 10B is a view illustrative of a hierarchical structure in which the search condition B in FIG. 10A has been changed.
Figure 10C:
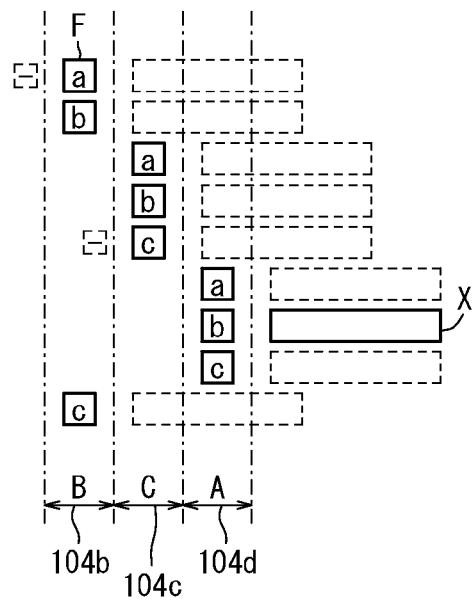
FIG. 10C is a view illustrative of a hierarchical structure in which the search condition A shown in FIG. 10A has been changed.
Figure 10D:
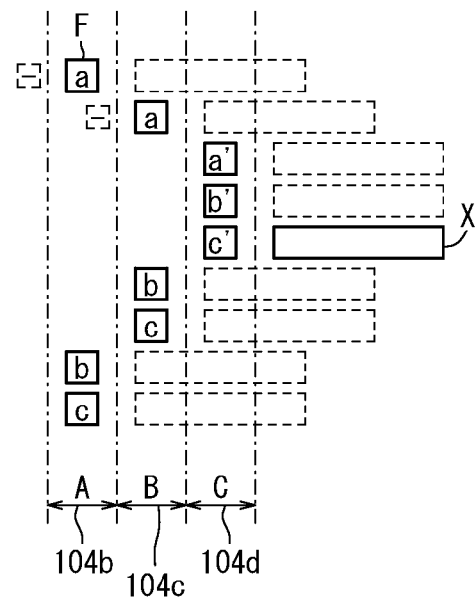
FIG. 10D is a view illustrative of another hierarchical structure in which the search condition B shown in FIG. 10A has been changed.

FIG. 10A is a view illustrative of a hierarchical structure of three search conditions A, B, C each having three alternatives a, b, c. FIG. 10B is a view illustrative of a hierarchical structure in which the search condition B in FIG. 10A is changed. FIG. 10C is a view illustrative of a hierarchical structure in which the search condition A in FIG. 10A is changed. FIG. 10D is a view illustrative of another hierarchical structure in which the search condition B in FIG. 10A is changed.

It shall also be assumed hereinafter that the printing conditions A, B, C are entered in this order (i.e., the printing condition A is set as the first condition, the printing condition B is set as the second condition, and the printing condition C is set as the third condition) based on an input action made by the user on the input device 12, and that the alternative a is selected for the printing condition A, the alternative b is selected for the printing condition B, and the alternative c is selected for the printing condition C.

The hierarchical display generator 28 constructs the hierarchical structure shown in FIG. 10A in the tree format display area 104, and displays the hierarchical structure on the display device 14. More specifically, the alternatives a, b, c for the printing condition A are placed in the first layer 104b, and the folder A-a with respect to the alternative a selected for the printing condition A is opened. When the folder A-a is opened, the folders A-b, A-c are shifted downward in position.

The alternatives a, b, c for the printing condition B are placed in the second layer 104c, and the folder B-b with respect to the alternative b selected for the printing condition B is opened. The alternatives a, b, c for the printing condition C are placed in the third layer 104d, and the folder C-c with respect to the alternative c selected for the printing condition C is opened. The condition entry order display area 106 displays "PRINTING CONDITION A>PRINTING CONDITION B>PRINTING CONDITION C". The search result display area 108 displays a list of imposition templates T having the printing conditions designated for the folders A-a, B-b, and C-c.

If the user changes the alternative c to the alternative a for the printing condition C, for example, then a frame X indicative of an alternative moves to the folder C-a, but the tree format of the hierarchical structure does not change. In other words, any changes in alternatives for the printing conditions in the rightmost layer do not result in a change in the tree format.

If the user changes the alternatives for the printing condition B, e.g., if the user changes the alternative b to the alternative a, then as shown in FIG. 10B, the tree structure also is changed. More specifically, if the printing condition B is changed, then since the second condition is changed, the printing condition C as the third condition is shifted upward to become the second layer. In this case, the newly changed condition B becomes the third condition.

Therefore, the alternatives a, b, c for the printing condition C are placed in the second layer 104c, and the folder C-c with respect to the alternative c selected for the printing condition C is opened. Also, the alternatives a, b, c for the printing condition B are placed in the third layer 104d, and the folder B-a with respect to the alternative a selected for the printing condition B is opened. As a result, the search result display area 108 displays a list of imposition templates T having printing conditions for the folders A-a, B-b, and C-c. The condition entry order display area 106 changes to display "PRINTING CONDITION A>PRINTING CONDITION C>PRINTING CONDITION B".

If the user changes the alternatives for the printing condition A, e.g., if the user changes the alternative a to the alternative b, then as shown in FIG. 10C, the tree structure also is changed. More specifically, if the printing condition A is changed, then since the first condition is changed, the printing condition B as the second condition is shifted upward into the first layer to become the first condition, and the printing condition C as the third condition is shifted upward into the second layer to become the second condition. In this case, the newly changed condition A becomes the third condition.

Therefore, the alternatives a, b, c for the printing condition B are placed in the first layer 104b, and the folder B-b is opened. The alternatives a, b, c for the printing condition C are placed in the second layer 104c, and the folder C-c is opened. The folder A-b, with respect to the alternative b selected for the printing condition A, is selected in the third layer 104d. As a result, the search result display area 108 displays a list of imposition templates T having printing conditions for the folders A-a, B-b, and C-c. The condition entry order display area 106 changes in order to display "PRINTING CONDITION B>PRINTING CONDITION C>PRINTING CONDITION A".

As described above, if printing conditions in layers on the left side of the rightmost layer are changed, then the order in which printing conditions are entered is changed, and hence the tree format also is changed in a corresponding manner. The tree format display area 104 displays a tree format representing the order in which the printing conditions A, B, C have been entered, thereby allowing the user to recognize how a given printing condition relates to other printing conditions. For example, the user can recognize at a glance which printing conditions have been selected and narrowed down to the printing conditions in the rightmost layer.

As shown in FIG. 10, search screen information processing system 10 may be configured so as not to change the hierarchical structure in response to a certain action (i.e., a menu setting). More specifically, in this case, if the alternative b for the printing condition B is changed to the alternative a, then the folder B-a is opened in the second layer 104c. Inasmuch as the alternative c for the printing condition C in the search condition menu display area 102 remains unchanged, a folder C-c' remains open with respect to alternatives a', b', c' for the printing condition C, which are opened by the folder B-a. The search result display area 108 displays a list of imposition templates T having printing conditions corresponding to the folders A-b, B-b, and C-c'.

Therefore, if the hierarchical structure of the printing conditions is not changed, and in the event that printing conditions in higher-level layers are changed, printing conditions in lower-level layers are significantly changed, thereby allowing the user to confirm easily how the plurality of newly set printing conditions are related to each other.

In the case that orders for many prints are constantly received from certain customers, it is possible to search for imposition templates easily by preferentially selecting the search conditions "CUSTOMER NAME" and "PRODUCT NAME". In this case, if the "PRODUCT NAME" is displayed in the tree format display area 104 in a layer beneath the "CUSTOMER NAME", it is possible for the user to grasp the relationship between the "CUSTOMER NAME" and the "PRODUCT NAME" with ease.

As described above, with the search screen information processing system 10 according to the present embodiment, a hierarchical structure of the search screen information is constructed in the search condition menu display area 102, according to the order in which a plurality of search conditions are entered, and folders F are displayed based on the hierarchical structure. When the user searches for an imposition template T, the user can easily confirm information (alternatives) of the folders F arranged in the hierarchical structure (tree format). The user can grasp how the folders F are related according to the order in which the search conditions are entered. In particular, the user can grasp how alternatives (search contents information) for the search conditions are related to each other. If data are to be searched for again, the searching process can be performed highly efficiently simply by entering search conditions based on the grasped relationship.

Since the condition entry order display area 106 displays a plurality of search conditions according to the order in which the search conditions have been entered, the user can easily determine the layers of the search conditions.

The preview display area 110 displays a preview of the imposition templates T. The user can observe the preview, and thus can easily find a desired imposition template T. Since the preview of the imposition templates T can be displayed as a scaled-down image, the processing burden on the computer 16 is reduced.

The folders F placed in the hierarchical structure may be selected by the user moving a pointer to the folders F. In the case that a folder F (alternative) is selected, folders in lower-level layers may be displayed, or search results based on alternatives may be displayed in the search result display area 108. The folders F thus selected and displayed allow the user to gain direct access to the folders F placed in the hierarchical structure, for thereby enabling a more efficient data search.

Since the search screen information processing system 10 displays image information of folders F together with the names of the folders F, the hierarchical structure is displayed in a manner similar to familiar folders that have heretofore been displayed by computers. Therefore, the user finds it easy and efficient to use the search screen information processing system 10.

Although a certain preferred embodiment of the present invention has been shown and described in detail, it should be understood that various changes and modifications may be made to the embodiment without departing from the scope of the invention as set forth in the appended claims.

What is claimed is:

1. A method of displaying search screen information with a display device for displaying the search screen information, an input device for entering a plurality of search conditions in the search screen information, and an information processing apparatus for acquiring a search result that agrees with entered search conditions, the information processing apparatus having a database of at least two data having search contents information related to the search conditions, wherein the search result acquired by the information processing apparatus is displayed in the search screen information, the method comprising the steps of:

displaying, as the search screen information, condition entry image information capable of entering the search contents information corresponding to the search conditions;

displaying data from the database that agree with a plurality of entered pieces of the search contents information; and generating symbol image information having an identification label based on the search contents information, constructing layers according to an order in which the search conditions are entered, and displaying a plurality of pieces of the symbol image information based on the constructed layers, wherein image information capable of identifying features of the at least two data as the search screen information is further displayed as a scaled-down image.

2. The method according to claim 1, wherein the search conditions are further displayed as the search screen information according to the order in which the search conditions are entered.

3. The method according to claim 1, wherein the symbol image information comprises image information recognizable as a folder, and the identification label is displayed as representing a name of the folder at a position near the image information recognizable as the folder.

4. The method according to claim 1, wherein the data comprises an imposition template having a pattern for imposing contents to be printed and printing conditions for printing the imposition template, and the search screen information is capable of entering the printing conditions of the data as the search conditions.

5. The method according to claim 1, wherein the steps further comprises:

displaying, as the condition entry image information, a plurality of dialog boxes, into which the search contents information corresponding to the plurality of search conditions is entered;

displaying the data based on at least one piece of the search contents information corresponding to the search conditions entered successively through one dialog box among the plurality of dialog boxes that has not been selected; and generating the constructing layers successively depending on the order in which the search conditions are entered to display the plurality of pieces of the symbol image information.

6. A method of displaying search screen information with a display device for displaying the search screen information, an input device for entering a plurality of search conditions in the search screen information, and an information processing apparatus for acquiring a search result that agrees with entered search conditions, the information processing apparatus having a database of at least two data having search contents information related to the search conditions, wherein the search result acquired by the information processing apparatus is displayed in the search screen information, the method comprising the steps of:

displaying, as the search screen information, condition entry image information capable of entering the search contents information corresponding to the search conditions;

displaying data from the database that agree with a plurality of entered pieces of the search contents information;

generating symbol image information having an identification label based on the search contents information, constructing layers according to an order in which the search conditions are entered, and displaying a plurality of pieces of the symbol image information based on the constructed layers;

placing the plurality of pieces of the symbol image information in one layer; and selecting one of the pieces of the symbol image information in the one layer, and if another of the pieces of the symbol image information is selected while information in a layer lower than the symbol image information or data related thereto is being displayed, switching to information in a layer lower than the other of the pieces of the symbol image information or data related thereto.

7. A search screen information processing system comprising:

a display device for displaying search screen information;

an input device for entering a plurality of search conditions in the search screen information;

an information processing apparatus for acquiring a search result that agrees with entered search conditions, the information processing apparatus having a database of at least two data having search contents information related to the search conditions, wherein the search result acquired by the information processing apparatus is displayed in the search screen information;

a condition entry screen display section for displaying, as the search screen information, condition entry image information capable of entering the search contents information corresponding to the search conditions;

a search result display section for displaying data from the database that agree with a plurality of entered pieces of the search contents information; and a hierarchical structure display section for generating symbol image information having an identification label based on the search contents information, constructing layers according to an order in which the search conditions are entered, and displaying a plurality of pieces of the symbol image information based on the constructed layers, wherein image information capable of identifying features of the at least two data as the search screen information is further displayed as a scaled-down image.

8. A non-transitory computer-readable storage medium storing therein a program for displaying search screen information, entering a plurality of search conditions in the search screen information, acquiring a search result that agrees with entered search conditions entered from a database of at least two data having search contents information related to the search conditions, and displaying the acquired search result in the search screen information, the program enabling a computer to function as:

a condition entry screen display section for displaying, as the search screen information, condition entry image information capable of entering the search contents information corresponding to the search conditions;

a search result display section for displaying data from the database that agree with a plurality of entered pieces of the search contents information; and a hierarchical structure display section for generating symbol image information having an identification label based on the search contents information, constructing layers according to an order in which the search conditions are entered, and displaying a plurality of pieces of the symbol image information based on the constructed layers, wherein image information capable of identifying features of the at least two data as the search screen information is further displayed as a scaled-down image.

9. A search screen information processing system comprising:

a display device for displaying search screen information;

an input device for entering a plurality of search conditions in the search screen information;

an information processing apparatus for acquiring a search result that agrees with entered search conditions, the information processing apparatus having a database of at least two data having search contents information related to the search conditions, wherein the search result acquired by the information processing apparatus is displayed in the search screen information;

a condition entry screen display section for displaying, as the search screen information, condition entry image information capable of entering the search contents information corresponding to the search conditions;

a search result display section for displaying data from the database that agree with a plurality of entered pieces of the search contents information;

a hierarchical structure display section for generating symbol image information having an identification label based on the search contents information, constructing layers according to an order in which the search conditions are entered, and displaying a plurality of pieces of the symbol image information based on the constructed layers;

an information placing section for placing the plurality of pieces of the symbol image information in one layer; and an information selecting section for selecting one of the pieces of the symbol image information in the one layer, and if another of the pieces of the symbol image information is selected while information in a layer lower than the symbol image information or data related thereto is being displayed, switching to information in a layer lower than the other of the pieces of the symbol image information or data related thereto.

10. A non-transitory computer-readable storage medium storing therein a program for displaying search screen information, entering a plurality of search conditions in the search screen information, acquiring a search result that agrees with entered search conditions entered from a database of at least two data having search contents information related to the search conditions, and displaying the acquired search result in the search screen information, the program enabling a computer to function as:

a condition entry screen display section for displaying, as the search screen information, condition entry image information capable of entering the search contents information corresponding to the search conditions;

a search result display section for displaying data from the database that agree with a plurality of entered pieces of the search contents information;

a hierarchical structure display section for generating symbol image information having an identification label based on the search contents information, constructing layers according to an order in which the search conditions are entered, and displaying a plurality of pieces of the symbol image information based on the constructed layers;

an information placing section for placing the plurality of pieces of the symbol image information in one layer; and an information selecting section for selecting one of the pieces of the symbol image information in the one layer, and if another of the pieces of the symbol image information is selected while information in a layer lower than the symbol image information or data related thereto is being displayed, switching to information in a layer lower than the other of the pieces of the symbol image information or data related thereto.

* * * * *